United States Patent [19]
Kim

[11] Patent Number: 5,618,059
[45] Date of Patent: Apr. 8, 1997

[54] SEAT BELT BUCKLE DEVICE FOR A VEHICLE

[75] Inventor: Ji-Ho Kim, Kyunnam-Do, Rep. of Korea

[73] Assignee: Hyundai Motor Company, Ltd., Seoul, Rep. of Korea

[21] Appl. No.: 515,895

[22] Filed: Aug. 16, 1995

[30] Foreign Application Priority Data

Aug. 16, 1994 [KR] Rep. of Korea ................. 94-20055

[51] Int. Cl.$^6$ .................................................. B60R 22/12
[52] U.S. Cl. .................. 280/805; 340/686; 280/801.1; 297/463.1; 297/472
[58] Field of Search ................................ 280/805, 801.1; 297/472, 471, 463.1; 340/436, 686

[56] References Cited

U.S. PATENT DOCUMENTS

| | | | |
|---|---|---|---|
| 3,649,786 | 3/1972 | Mauron | 280/805 |
| 3,938,627 | 2/1976 | Nagazumi | 297/472 |
| 4,958,853 | 9/1990 | Doty | 280/801.1 |

FOREIGN PATENT DOCUMENTS 3900066  7/1989  Germany ........................... 280/805

*Primary Examiner*—Eric D. Culbreth
*Attorney, Agent, or Firm*—Birch, Stewart, Kolasch & Birch, LLP

[57] ABSTRACT

A seat belt buckle device for a vehicle includes a lower stay having a guide slot, a C-shaped impact-absorbing plate fixed to the lower stay at a lower wall, and an upper stay having a switch connector and fixed to an upper wall of the impact-absorbing plate, whereby when a traffic accident occurs, the C-shaped impact-absorbing plate is transformed, whereby an overload of the seat belt can be effectively eliminated and reduced and when the impact-absorbing plate is exhausted, a warning lamp is illuminated, and the impact-absorbing plate can be replaced.

7 Claims, 1 Drawing Sheet

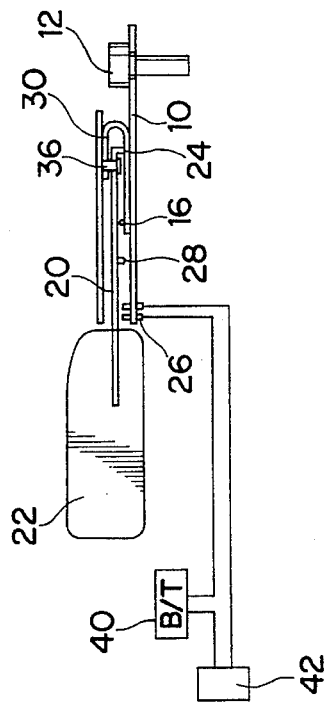
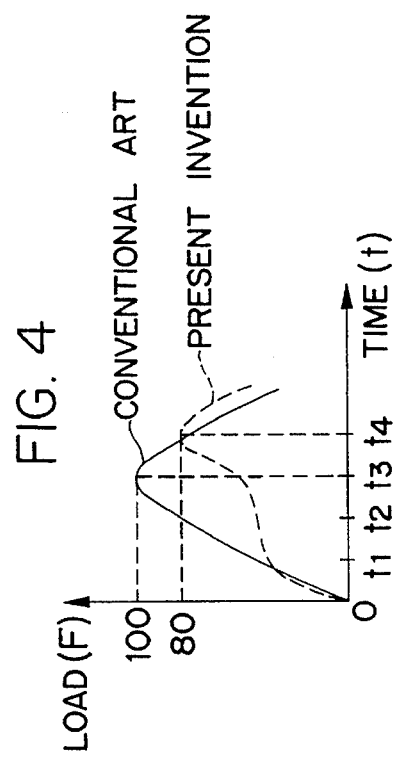
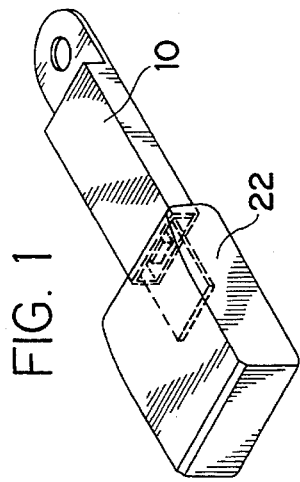
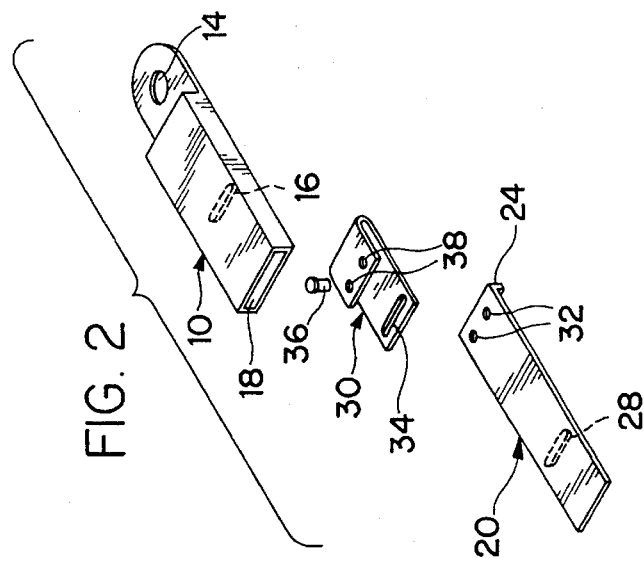

SEAT BELT BUCKLE DEVICE FOR A VEHICLE

BACKGROUND OF THE INVENTION

1. Field of the Invention

The present invention relates to a seat belt buckle device for a vehicle and more particularly, to an improved seat belt buckle device for use in a vehicle, which includes an impact energy absorbing steel plate for absorbing a belt overload when a traffic accident occurs so as to prevent injury to the human body and provide a comfortable feeling to the driver and passengers in the vehicle.

2. Description of Related Art

Various types of seat belt buckle devices for a vehicle are known in the art. Generally, such a conventional seat belt buckle device includes a stay on a buckle which becomes tightly engaged when a traffic accident occurs, so that the seat belt buckle device imparts a tight feeling to the driver and passenger in the vehicle. Sometimes, however, the seat belt buckle device accelerates injury to the human body. Also, the conventional seat belt buckle devices do not have a warning system such as a warning lamp which indicates a need to replace the buckle.

SUMMARY OF THE INVENTION

Therefore, it is an object of the present invention to provide a seat belt buckle device for a vehicle for eliminating the above problems encountered with conventional seat belt buckle devices.

Another object of the present invention is to provide an improved seat belt buckle device for use in a vehicle, which includes a lower stay connected to a buckle and having a guide hollow, and a C-shaped impact absorbing plate fixed to a lower stay for slidably inserting into the guide hollow whereby when a traffic accident occurs, upon transforming the C-shaped impact absorbing plate, overload of the seat belt can be effectively absorbed by the impact-absorbing plate so as to provide a comfortable feeling for passengers and prevent injury to the human body.

Still another object of the present invention is to provide a seat belt buckle device for a vehicle, which is simple in structure, inexpensive to manufacture, and durable in use.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a seat belt buckle device for a vehicle, which includes an outer stay having a guide hollow formed therein, a C-shaped impact absorbing plate fixed to the outer stay at a lower wall, and an inner stay having a switch connector and fixed to an upper wall of the impact absorbing plate, whereby when a traffic accident occurs, upon transforming the C-shaped impact absorbing plate, an overload of the seat belt can be effectively eliminated and reduced, and when at least the impact-absorbing plate is exhausted, a warning lamp is actuated by completing a circuit with the switch connector, so that the impact absorbing plate can be timely changed.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is a perspective view of a seat belt buckle device according to the present invention;

FIG. 2 is an exploded perspective view of the seat belt buckle device according to the present invention;

FIG. 3 is a sectional view of the seat belt buckle device according to the present invention in a locking state thereof; and FIG. 4 is a comparison graph of the present invention compared with a conventional art device in order to illustrate a seat belt load about a seat belt buckle.

DETAILED DESCRIPTION OF THE PREFERRED EMBODIMENTS

Referring now in detail to the drawings for the purpose of illustrating the preferred embodiments of the present invention, the seat belt buckle device for a vehicle as shown in FIGS. 1, 2, and 3, comprises an outer stay 10 having a guide slot 18 formed therethrough, a C-shaped impact-absorbing plate 30 slidably inserted into the guide slot 18 of the lower stay 10, and an inner stay 20 slidably inserted into the impact-absorbing plate 30 and the guide slot 18 of the outer stay 10 at one end portion thereof and slidably inserted into a buckle 22 at the other end portion thereof.

The outer stay 10 includes a first aperture 14 at one end portion thereof for fixing it to the floor bottom or chassis at the interior of the vehicle through a fixing member such as a first bolt 12. A first stopper 16 is formed as a raised portion disposed on the inner surface of a lower wall of the outer stay 10 so as to project into the guide slot 18.

The inner stay 20 includes as a second stopper 24 a raised portion downwardly extended from one end thereof for spacing the inner stay apart from the lower wall of the outer stay 10 and limiting the sliding movement of the inner stay 20. A switch connector 28 as a raised portion is disposed on the bottom surface of the inner stay 20 for engagement with a switch 26. The switch 26 is connected to a warning lamp 42 and a battery 40 (FIG. 3), and a pair of third apertures 32 are provided adjacent to the second stopper 24.

The impact-absorbing plate 30 which can be made of a steel material, has a C-shaped configuration, and an upper wall which is shorter than the lower wall thereof. A pair of second apertures 38 are disposed in the upper wall of the impact-absorbing plate 30 for fixing it to the inner stay 20 through a pair of second bolts 36, as shown in FIGS. 2 and 3. Also, the impact-absorbing plate 30 further includes a slot 34 for receiving the first stopper 16 therein when the impact-absorbing plate 34 is assembled with the outer stay 10 (FIG. 3). In other words, the lower wall of the impact-absorbing plate is held stationary with respect to the outer stay 10 by positioning the projection 16 of the outer stay 10 through the slot 34 of the impact-absorbing plate 30.

The impact-absorbing plate 30 functions under any impact energy and more specifically, absorbs the seat belt load by the bending energy thereof. Therefore, in order to absorb the seat belt load, the thickness of the plate 30 is increased and the bending diameter of the plate 30 is decreased.

The seat belt buckle device according to the present invention operates as follows. When a traffic accident occurs, the buckle 22 is pulled and the inner stay 20 is pulled. At this time, the upper wall of the C-shaped impact-absorbing plate 30 is pulled by the inner stay 20. Therefore, the upper wall of the plate 30 is to be transformed to extend to the length of the lower wall of the plate 30. Accordingly, the impact-absorbing plate 30 absorbs any overload to the seat belt (not shown) thereby preventing over-fastening or excessive tightening of the seat belt and reducing bodily injury.

When a strong force is applied to the impact-absorbing plate 30 and such a bending force repeatedly occurs, the upper and lower walls of the impact-absorbing plate 30 will eventually weaken and be transformed to a similar length. At this time, the second stopper 24 of the inner stay 20 abuts against the first stopper 16 of the outer stay 10, and the inner stay 20 stops. At the same time, the switch connector 28 engages with and activates the switch 26, so that the warning lamp 42 is illuminated. Accordingly, at this time, the vehicle operator is warned that the impact-absorbing plate 30 has to be changed to a new one.

Accordingly, the seat belt buckle device of the provides an impact-absorbing plate 30 having a C-shaped present invention has a number of advantages such as, for example, as shown in FIG. 4. Since the present invention configuration, the transmission of the seat belt load to the passenger is effectively delayed and any overload of the seat belt is absorbed. Also a tight fastening of the seat belt is prevented when a traffic accident occurs, which eliminates or reduces injury to the human body as compared with the conventional seat belt buckle devices.

In addition, since the seat belt buckle of the present invention provides a warning lamp 42 which is illuminated when the C-shaped impact-absorbing plate 30 having a spring force and a tension is exhausted, the buckle 22 of the seat belt buckle device of the present invention can be replaced so as to continuously prevent injury to the passenger.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat belt buckle device for a vehicle comprising:

an outer stay having a guide slot formed therethrough and a first aperture at one end portion thereof, said outer stay further having a first stopper disposed on an inner surface of a lower wall thereof and extending into said guide slot;

a C-shaped impact-absorbing plate having an upper wall and a lower wall, said impact-absorbing plate being adapted to be slidably inserted into the guide slot of the outer stay, said C-shaped impact-absorbing plate having second apertures disposed in said upper wall and a slot formed in said lower wall thereof; and an inner stay connected to a seat belt buckle, said inner stay having a second stopper downwardly extending from one end portion thereof, and a switch connector disposed on a bottom surface thereof adjacent an opposite end portion thereof, whereby when a traffic accident occurs causing a vehicle impact, the inner stay and the impact-absorbing plate are pulled, the impact-absorbing plate is transformed whereby the upper wall is extended toward the length of the lower wall for absorbing an overload to the seat belt and a warning lamp is illuminated for indicating a need to change an exhausted impact-absorbing plate.

2. The seat belt buckle device of claim 1 wherein the first aperture in the outer stay is fixed to the chassis of the vehicle by a fixing member.

3. The seat belt buckle device of claim 2, wherein said fixing member is a bolt.

4. The seat belt buckle device of claim 1, wherein said impact-absorbing plate is made of a steel material.

5. The seat belt buckle device of claim 1, wherein said inner stay has third apertures disposed adjacent the second stopper and means are provided for connecting the inner stay with the impact absorbing plate through the respective second and third apertures.

6. The seat belt buckle device of claim 5, wherein when said outer and inner stays and said impact-absorbing plate are assembled together and the first stopper of the outer stay is engaged with the slot formed in the lower wall of the impact-absorbing plate.

7. The seat belt buckle device of claim 1, wherein a switch is attached to the outer stay and operatively connected to a battery and said warning lamp whereby when the impact-absorbing plate exhibits fatigue, the switch connector contacts the switch which illuminates the warning lamp.

\* \* \* \* \*